United States Patent
DeWall et al.

(10) Patent No.: US 11,614,618 B2
(45) Date of Patent: Mar. 28, 2023

(54) SYSTEM FOR USING DIGITAL LIGHT PROJECTORS FOR AUGMENTED REALITY

(71) Applicant: Snap Inc., Santa Monica, CA (US)

(72) Inventors: Jeffrey Michael DeWall, Arvada, CO (US); Dominik Schnitzer, Vienna (AT); Amit Singh, Los Angeles, CA (US); Daniel Wagner, Vienna (AT)

(73) Assignee: SNAP INC., Santa Monica, CA (US)

( * ) Notice: Subject to any disclaimer, the term of this patent is extended or adjusted under 35 U.S.C. 154(b) by 64 days.

(21) Appl. No.: 17/301,657

(22) Filed: Apr. 9, 2021

(65) Prior Publication Data

US 2022/0206292 A1    Jun. 30, 2022

Related U.S. Application Data

(60) Provisional application No. 63/132,023, filed on Dec. 30, 2020.

(51) Int. Cl.
*G02B 27/00* (2006.01)
*G02B 27/01* (2006.01)

(52) U.S. Cl.
CPC ..... *G02B 27/0025* (2013.01); *G02B 27/0018* (2013.01); *G02B 27/0172* (2013.01); *G02B 2027/0138* (2013.01)

(58) Field of Classification Search
None
See application file for complete search history.

(56) References Cited

U.S. PATENT DOCUMENTS

| 11,025,892 | B1* | 6/2021 | Aman | H04N 21/458 |
| 2006/0256140 | A1 | 11/2006 | Turner | |
| 2019/0129166 | A1* | 5/2019 | Perreault | G02B 27/0961 |
| 2020/0201050 | A1 | 6/2020 | Osterhout et al. | |

FOREIGN PATENT DOCUMENTS

WO    WO-2022146781 A1    7/2022

OTHER PUBLICATIONS

"International Application Serial No. PCT/US2021/064593, International Search Report, dated Apr. 14, 2022", 5 pgs.
"International Application Serial No. PCT/US2021/064593, Written Opinion dated Apr. 14, 2022", 8 pgs.
Koulieris, G A, "Near-Eye Display and Tracking Technologies for Virtual and Augmented Reality", Computer Graphics Forum : Journal of the European Association for Computer Graphics, vol. 38, No. 2, [Online] Retrieved from the internet: <URL: https://onlinelibrary.wiley.com/doi/full-xml/10.1111/cgf.13654>, (May 1, 2019), 27 pgs.

* cited by examiner

*Primary Examiner* — Nicholas J Lee
(74) *Attorney, Agent, or Firm* — Schwegman Lundberg & Woessner, P.A.

(57) ABSTRACT

A method for configuring a digital light projector (DLP) of an augmented reality (AR) display device is described. A light source component of the DLP projector is configured to generate a single red-green-blue color sequence repetition per image frame. The AR display device identifies a color sequence of the light source component of the DLP projector and tracks a motion of the AR display device. The AR display device adjusts an operation of the DLP projector based on the single red-green-blue color sequence repetition, the color sequence of the light source component of the DLP projector, and the motion of the AR display device.

14 Claims, 14 Drawing Sheets

SYSTEM FOR USING DIGITAL LIGHT PROJECTORS FOR AUGMENTED REALITY

CROSS-REFERENCE

The present application claims priority to U.S. Provisional Patent Application Ser. No. 63/132,023, filed Dec. 30, 2020, which is hereby incorporated by reference in its entirety.

TECHNICAL FIELD

The subject matter disclosed herein generally relates to a display system. Specifically, the present disclosure addresses systems and methods for using digital light projectors for augmented reality.

BACKGROUND

An augmented reality (AR) device enables a user to observe a real-world scene while simultaneously view virtual content that may be aligned to items, images, objects, or environments in the field of view of the device. The AR device includes a partially transparent display that generates a composite image of the virtual content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
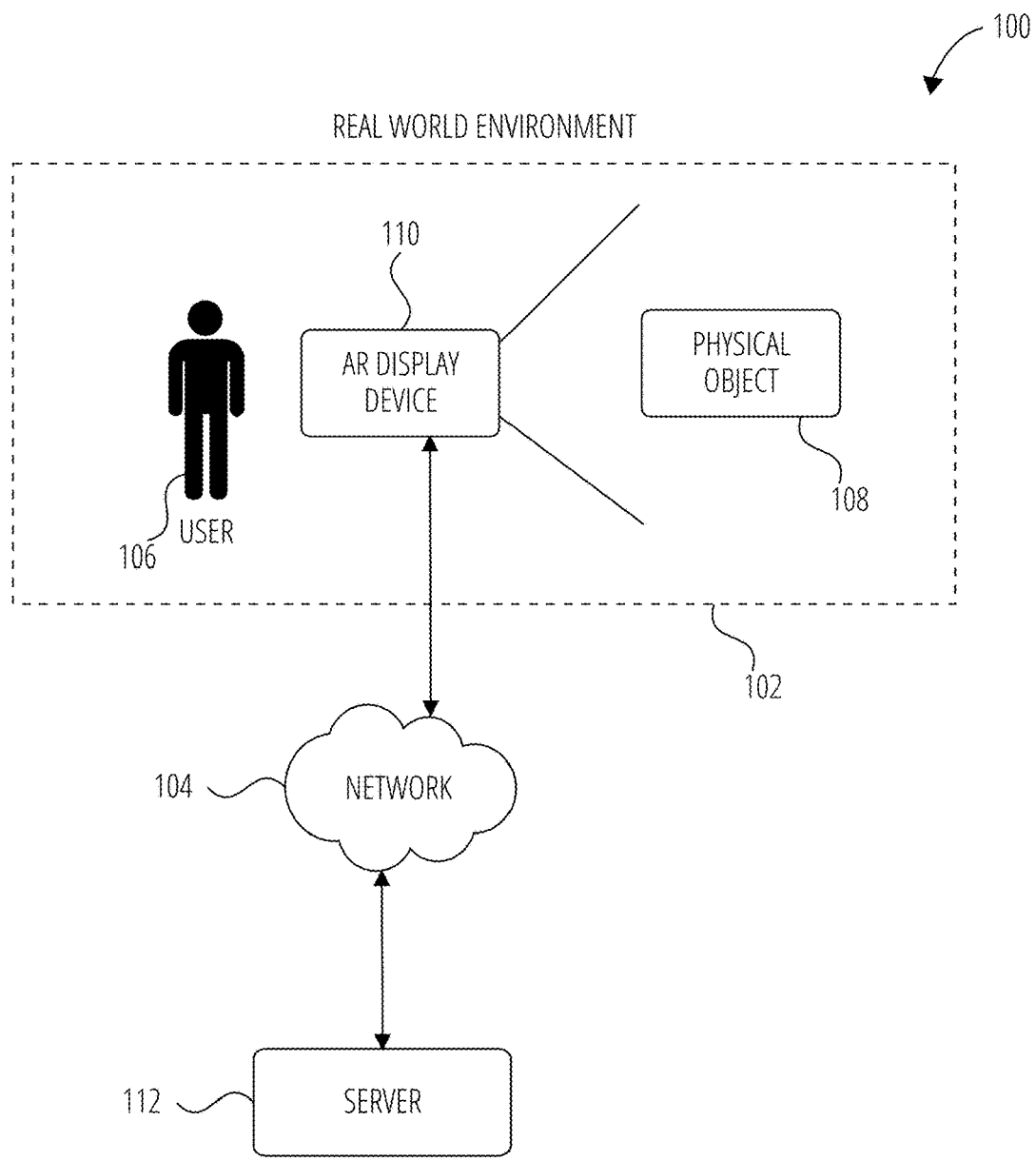
FIG. 1 is a block diagram illustrating a network environment for operating an Augmented Reality (AR) display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

An AR application allows a user to experience information, such as in the form of a virtual object rendered in a display of an AR display device (also referred to as a display device). The rendering of the virtual object may be based on a position of the display device relative to a physical object or relative to a frame of reference (external to the display device) so that the virtual object correctly appears in the display. The virtual object appears aligned with a physical object as perceived by the user of the AR display device. Graphics (e.g., graphical elements containing instructions and guides) appear to be attached to a physical object of interest. In order to do this, the AR display device detects the physical object and tracks a pose of the AR display device relative to a position of the physical object. A pose identifies a position and orientation of the object relative to a frame of reference or relative to another object.

In one example, the AR display device includes a projector (e.g., Digital Light Projector (DLP)) that displays the virtual object on a screen of the AR display device. DLP projectors operate by projecting a light from a light source through a color wheel towards a DMD (Digital Micromirror Device). The DMD controls whether to reflect the colored light towards the screen of the AR display device. DLP projectors create color for the human eye by cycling through (R)ed, (G)reen, (B)lue bit-planes at very high rates (e.g., 10 kHz). The sum of all bit-planes creates the impression of color for the human eye. The order of showing the bit-planes is optimized for each DLP projector individually (in terms of power and colors). As such, different DLP projectors will have different color cycle arrangements. Furthermore, depending on the frame rate of a DLP projector, the DLP projector repeats the bit plane sequence to fill the frame time (e.g., cycled). As such, each DLP projector is typically configured to optimize the bit-plane sequence (for power saving, color calibration, reduction of the rainbow artifacts (for wall projectors)).

The conditions of using a DLP projector to project on a stationary wall and using a DLP projector in a moving AR display device are fundamentally different. For example, when a user wears the AR display device and moves his/her head, the following effects occur:

Ghosting effect: as the DLP projector repeats color sequences multiple times per frame, the displayed content appears multiple times, giving the impression of stuttering rendering or ghost images.

Color breakup effect: when the AR display device displays a tracked 3D virtual object in space, its colors will break up if the user moves yielding unreadable text, blurry objects, and an unpleasant experience.

High pixel persistence effect: persistence refers to as the time each pixel remains lit. High persistence causes blurring and smearing of the images.

The present application describes a system and a method for configuring an operation of a DLP projector for use in an AR display device. By being able to predict where and how to render colors under user motion, the AR display device can effectively compensate motion-to-photon latency on a per color basis. The prediction can be accomplished by configuring the DLP projector to generate a single RGB repetition per frame, to identify a predefined color sequence of a light source component of the DLP projector, and to reduce a pixel persistence of the DLP projector. By changing the operation of the DLP projector as presently described results in higher AR image quality (e.g., virtual objects will not dissolve or be shown multiple times per frame, text in AR space will become more readable).

In one example embodiment, a method for configuring a digital light projector (DLP) of an augmented reality (AR) display device is described. A light source component of the DLP projector is configured to generate a single red-green-blue color sequence repetition per image frame. The AR display device identifies a color sequence of the light source component of the DLP projector and tracks a motion of the AR display device. The AR display device adjusts an operation of the DLP projector based on the single red-green-blue color sequence repetition, the color sequence of the light source component of the DLP projector, and the motion of the AR display device.

In another example embodiment, the method further comprises determining an adjusted pixel persistence value based on the identified color sequence and the single red-green-blue color sequence repetition per image frame; replacing the default pixel persistence value with the adjusted pixel persistence value; and operating the DLP projector with the adjusted pixel persistence value.

As a result, one or more of the methodologies described herein facilitate solving the technical problem of image ghosting, colors breakup, and high pixel persistence of a DLP projector mounted on a mobile unit by configuring the DLP projector to generate a single red-green-blue color sequence repetition per image frame, to identify a color sequence of the light source component, and to reduce a pixel persistence. The presently described method provides an improvement to an operation of the DLP projector by providing operation configurations. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating a network environment 100 suitable for operating an AR display device 110, according to some example embodiments. The network environment 100 includes an AR display device 110 and a server 112, communicatively coupled to each other via a network 104. The AR display device 110 and the server 112 may each be implemented in a computer system, in whole or in part, as described below with respect to FIG. 14. The server 112 may be part of a network-based system. For example, the network-based system may be or include a cloud-based server system that provides additional information, such as virtual content (e.g., three-dimensional models of virtual objects) to the AR display device 110.

A user 106 operates the AR display device 110. The user 106 may be a human user (e.g., a human being), a machine user (e.g., a computer configured by a software program to interact with the AR display device 110), or any suitable combination thereof (e.g., a human assisted by a machine or a machine supervised by a human). The user 106 is not part of the network environment 100, but is associated with the AR display device 110.

The AR display device 110 may be a computing device with a display such as a smartphone, a tablet computer, or a wearable computing device (e.g., glasses). The computing device may be hand-held or may be removable mounted to a head of the user 106. In one example, the display may be a screen that displays what is captured with a camera of the AR display device 110. In another example, the display of the device may be transparent such as in lenses of wearable computing glasses.

The user 106 operates an application of the AR display device 110. The application may include an AR application configured to provide the user 106 with an experience triggered by a physical object 108, such as a two-dimensional physical object (e.g., a picture), a three-dimensional physical object (e.g., a statue), a location (e.g., in a facility), or any references (e.g., perceived corners of walls or furniture) in the real-world physical environment. For example, the user 106 may point a camera of the AR display device 110 to capture an image of the physical object 108. The image is tracked and recognized locally in the AR display device 110 using a local context recognition dataset module of the AR application of the AR display device 110. The local context recognition dataset module may include a library of virtual objects associated with real-world physical objects or references. The AR application then generates additional information corresponding to the image (e.g., a three-dimensional model) and presents this additional information in a display of the AR display device 110 in response to identifying the recognized image. If the captured image is not recognized locally at the AR display device 110, the AR display device 110 downloads additional information (e.g., the three-dimensional model) corresponding to the captured image, from a database of the server 112 over the network 104.

In one example embodiment, the server 112 may be used to detect and identify the physical object 108 based on sensor data (e.g., image and depth data) from the AR display device 110, determine a pose of the AR display device 110 and the physical object 108 based on the sensor data. The server 112 can also generate a virtual object based on the pose of the AR display device 110 and the physical object 108. The server 112 communicates the virtual object to the AR display device 110. The object recognition, tracking, and AR rendering can be performed on either the AR display device 110, the server 112, or a combination between the AR display device 110 and the server 112.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9 to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., AR display device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
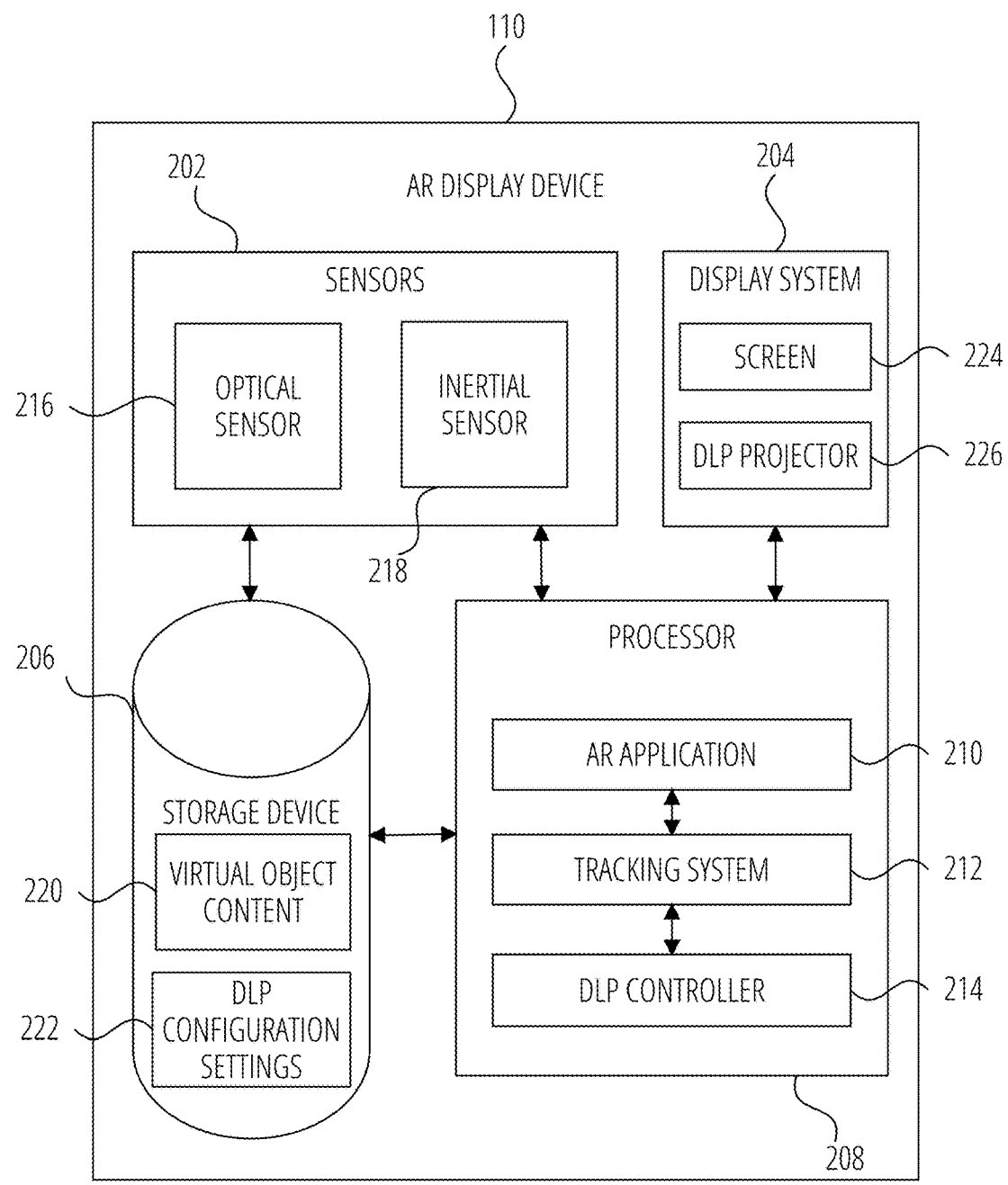
FIG. 2 is a block diagram illustrating an AR display device in accordance with one example embodiment.

FIG. 2 is a block diagram illustrating modules (e.g., components) of the AR display device 110, according to some example embodiments. The AR display device 110 includes sensors 202, a display system 204, a processor 208, and a storage device 206. Examples of AR display device 110 include a wearable computing device, a desktop computer, a vehicle computer, a tablet computer, a navigational device, a portable media device, or a smart phone.

The sensors 202 include, for example, an optical sensor 216 (e.g., camera such as a color camera, a thermal camera, a depth sensor and one or multiple grayscales, global shutter tracking cameras) and an inertial sensor 218 (e.g., gyroscope, accelerometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display system 204 includes a screen 224 and a DLP projector 226. The DLP projector 226 projects an image of a virtual object on the screen 224. In one example embodiment, the screen 224 may be transparent or semi-opaque so that the user 106 can see through the screen 224 (in AR use case). The DLP projector 226 is configured to operate with a predictable color sequence, a single RGB color cycle per frame, and a shorter pixel persistence. The DLP projector 226 is described in more detail below with respect to FIG. 3.

The processor 208 includes an AR application 210, a tracking system 212, and a DLP controller 214. The AR application 210 detects and identifies a physical environment or the physical object 108 using computer vision. The AR application 210 retrieves a virtual object (e.g., 3D object model) based on the identified physical object 108 or physical environment. The AR application 210 renders the virtual object in the display system 204. For an AR application, the AR application 210 includes a local rendering engine that generates a visualization of a virtual object overlaid (e.g., superimposed upon, or otherwise displayed in tandem with) on an image of the physical object 108 captured by the optical sensor 216. A visualization of the virtual object may be manipulated by adjusting a position of the physical object 108 (e.g., its physical location, orientation, or both) relative to the optical sensor 216. Similarly, the visualization of the virtual object may be manipulated by adjusting a pose of the AR display device 110 relative to the physical object 108.

In one example embodiment, the AR application 210 includes a contextual local image recognition module (not shown) configured to determine whether the captured image matches an image locally stored in a local database (e.g., storage device 206) of images and corresponding additional information (e.g., virtual model and interactive features) on the AR display device 110. In one example, the contextual local image recognition module retrieves a primary content dataset from the server 112, and generates and updates a contextual content dataset based on an image captured with the AR display device 110.

The tracking system 212 tracks the pose (e.g., position and orientation) of the AR display device 110 relative to the real world environment 102 using optical sensors (e.g., depth-enabled 3D camera, image camera), inertia sensors (e.g., gyroscope, accelerometer), wireless sensors (Bluetooth, Wi-Fi), GPS sensor, and/or audio sensor to determine the location of the AR display device 110 within the real world environment 102. The tracking system 212 includes, for example, accesses inertial sensor data from the inertial sensor 218, optical sensor data from the optical sensor 216, and determines its pose based on the combined inertial sensor data and the optical sensor data. In another example, the tracking system 212 determines a pose (e.g., location, position, orientation) of the AR display device 110 relative to a frame of reference (e.g., real world environment 102). In another example, the tracking system 212 includes a visual odometry system that estimates the pose of the AR display device 110 based on 3D maps of feature points from the inertial sensor data and the optical sensor data.

The DLP controller 214 communicates data signals to the DLP projector 226 to project the virtual content onto the screen 224 (e.g., transparent display). The DLP controller 214 includes a hardware that converts signals from the AR application 210 to display signals for the DLP projector 226. In one example embodiment, the DLP controller 214 is part of the processor 208. In another example embodiment, the DLP controller 214 is part of the DLP projector 226.

In one example embodiment, the DLP controller 214 configures the DLP projector 226 to operate with a predictable color sequence, a single RGB color cycle per frame, and a shorter pixel persistence. For example, the DLP controller 214 determines or identifies the color sequence pattern of the DLP projector 226. The DLP controller 214 directs the light source (or a color filter system) of the DLP projector 226 to produce a single color cycle per frame. The DLP controller 214 also directs a Digital Micro-mirror Device (DMD) of the DLP projector 226 to generate a shorter pixel persistence. The DLP controller 214 is described in more detail below with respect to FIG. 4.

The storage device 206 stores virtual object content 220 and DLP configuration settings 222. The virtual object content 220 includes, for example, a database of visual references (e.g., images) and corresponding experiences (e.g., three-dimensional virtual objects, interactive features of the three-dimensional virtual objects). In one example embodiment, the storage device 206 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images. The core set of images may include a limited number of images identified by the server 112. For example, the core set of images may include the images depicting covers of the ten most viewed physical objects and their corresponding experiences (e.g., virtual objects that represent the ten most viewed physical objects). In another example, the server 112 may generate the first set of images based on the most popular or often scanned images received at the server 112.

Thus, the primary content dataset does not depend on physical objects or images obtained by the optical sensor 216.

The contextual content dataset includes, for example, a second set of images and corresponding experiences (e.g., three-dimensional virtual object models) retrieved from the server 112. For example, images captured with the AR display device 110 that are not recognized (e.g., by the server 112) in the primary content dataset are submitted to the server 112 for recognition. If the captured image is recognized by the server 112, a corresponding experience may be downloaded at the AR display device 110 and stored in the contextual content dataset. Thus, the contextual content dataset relies on the context in which the AR display device 110 has been used. As such, the contextual content dataset depends on objects or images scanned by AR display device 110.

The DLP configuration settings 222 include, for example, settings for the DLP projector 226 and/or determined by the DLP controller 214. Example of settings include RGB bit-planes cycle rate, frame rate, color sequence, and pixel persistence time.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
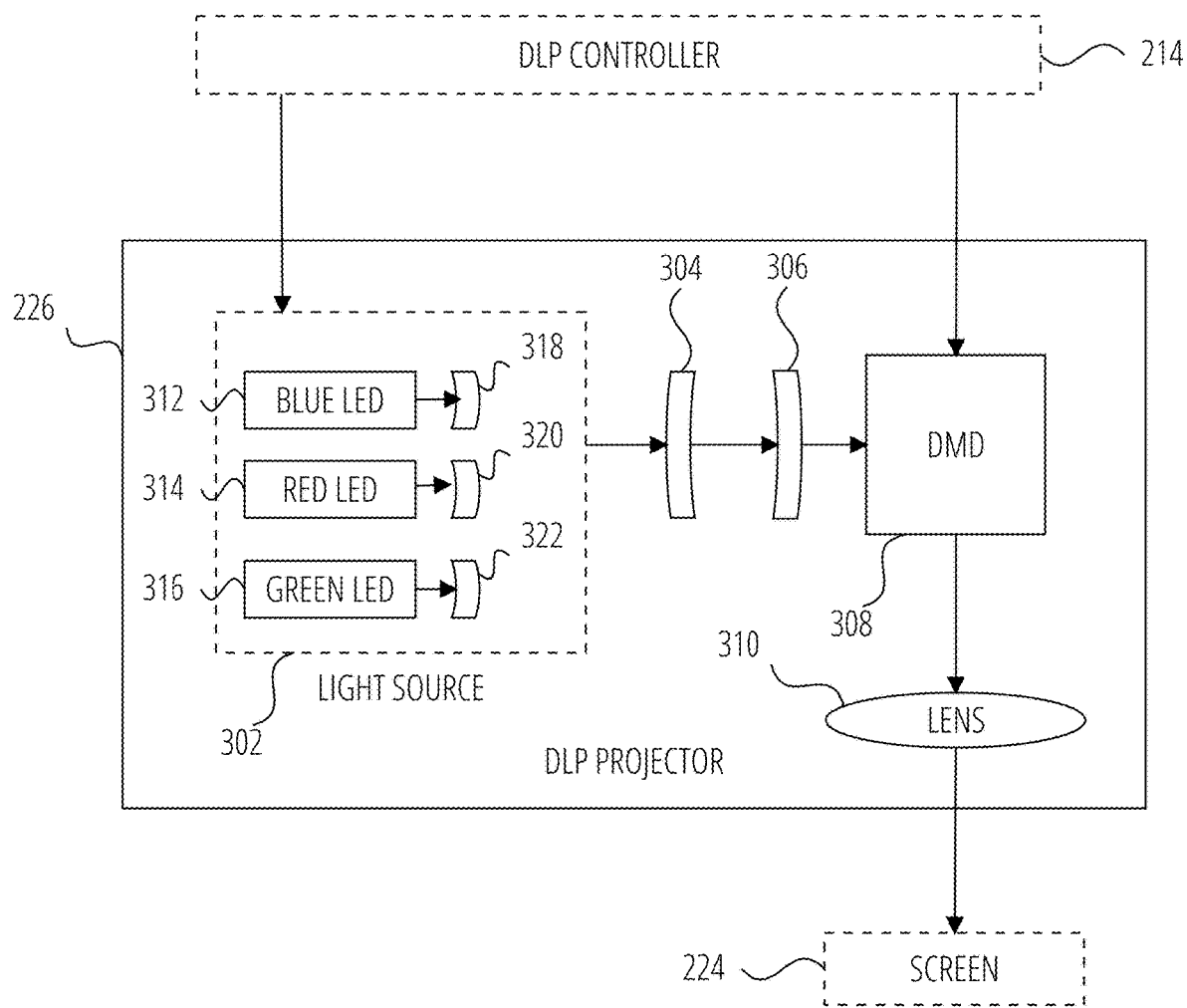
FIG. 3 is a block diagram illustrating a DLP projector in accordance with one example embodiment.

FIG. 3 is a block diagram illustrating the DLP projector 226 in accordance with one example embodiment. The DLP controller 214 includes a light source 302 (also referred to as light source component), a condensing lens 304, a shaping lens 306, a DMD 308, and a projection lens 310.

The light source 302 includes, for example, a pressurized light bulb, a laser, or a high-powered LED. In one example embodiment, the light source 302 includes three colored LEDs: a blue LED 312, a red LED 314, and a green LED 316. Each colored LED emits a colored light at its corresponding collimating lens (e.g., collimating lens 318, collimating lens 320, collimating lens 322).

The DLP controller 214 interfaces with the light source 302 of the DLP projector 226 and controls the light source 302 to generate a single RGB repetition per frame. In one example embodiment, the DLP controller 214 interfaces with the light source 302 and identifies the color sequence of the light source 302. For example, the DLP controller 214 queries the DLP projector 226 and identifies a model of the DLP projector 226. The DLP controller 214 identifies the color sequence of the light source 302 based on the model of the DLP projector 226.

In another example embodiment, the light source 302 includes for example, a white light source (not shown) and a color wheel (not shown) that is divided into primary colors (red, green, and blue). The color wheel rotates at a high speed (e.g., 7200 RPM). The DLP controller 214 synchronizes the rotating motion of the color wheel so that the green component is displayed on the DMD when the green section of the color wheel is in front of the lamp. The same is true for the red, blue and other sections. The colors are displayed sequentially at a sufficiently high rate that the observer sees a composite (full color) image. Black color is produced by directing unused light away from the light source 302. For example, the unused light is scattered to reflect and dissipate on the interior walls of the DMD 308 or projection lens 310. The DLP controller 214 operates the light source 302 so that the color wheel rotates one RGB cycle per frame.

The condensing lens 304 focuses the light from the light source 302 onto the shaping lens 306. The shaping lens 306 diffuses the light from the light source 302 to the DMD 308. The DMD 308 includes hundreds of individual micromirrors. Digital signals that represent 0 and 1 drive those micromirrors to rotate to selected angles to reflect unnecessary light, and direct the required light to the projection lens 310. Through persistence of visual, lights of different colors are synthesized to become a colored image to the human eyes. In one example embodiment, the DLP controller 214 controls the DMD 308 to reduce persistence of each pixel. Persistence may be referred to as the time each pixel remains lit. High persistence (e.g., 8.3 ms at 120 Hz) causes blurring and smearing of the images. The DLP controller 214 reduces the persistence of each pixel to, for example, less than 3 ms.

Figure 4:
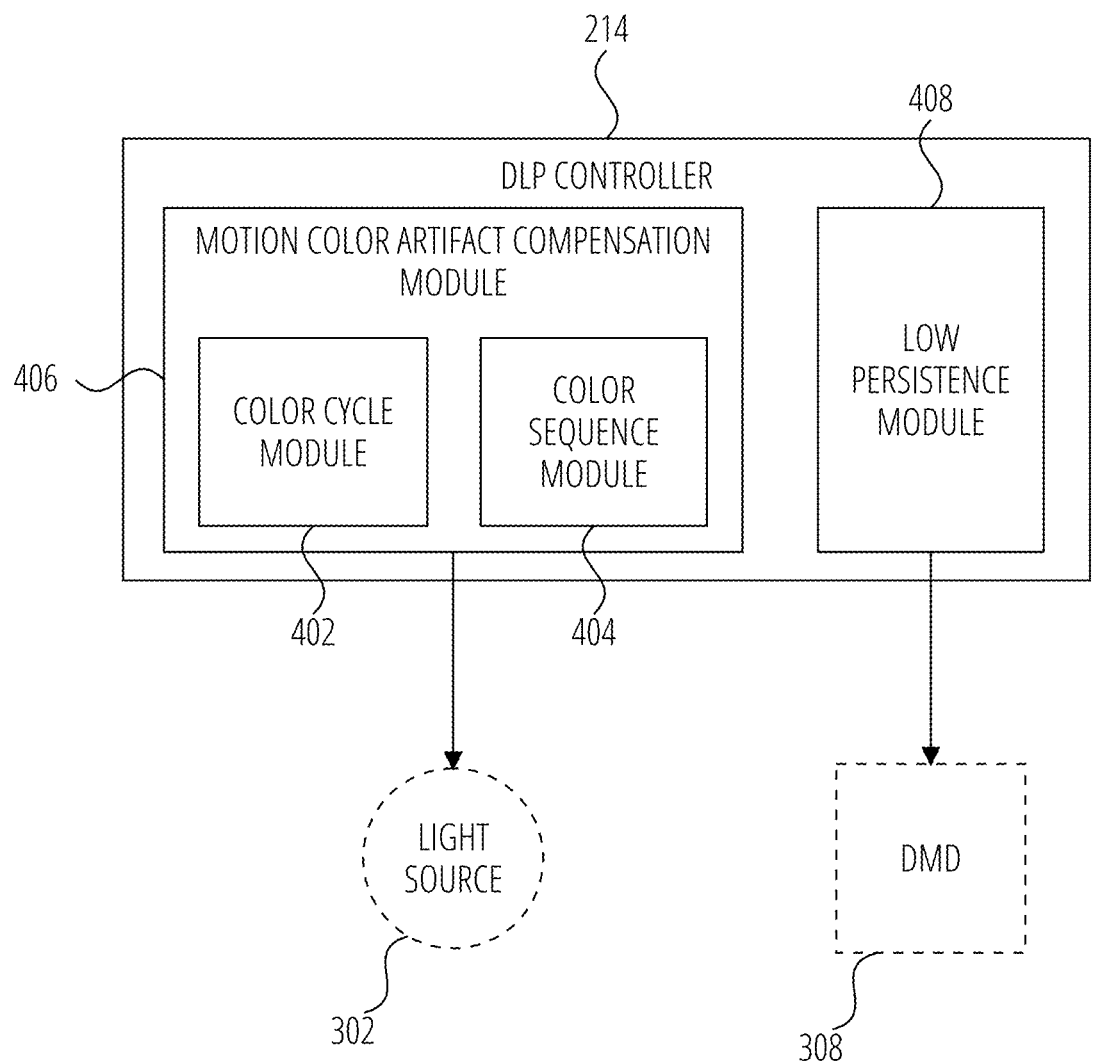
FIG. 4 is a block diagram illustrating a DLP controller in accordance with one example embodiment.

FIG. 4 illustrates the DLP controller 214 in accordance with one example embodiment. The DLP controller 214 includes a motion color artifact compensation module 406 and a low persistence module 408. The motion color artifact compensation module 406 reduces the color artifact produced by a motion of the AR display device 110. For example, as the user 106 moves his head (with the AR display device 110 mounted to his head) a displayed virtual content will break up in its base colors (RGB), more precisely the color sequence will become visible.

DLP projectors utilizing a mechanical spinning color wheel exhibit this color break up also known as the "rainbow effect". This is best described as brief flashes of perceived red, blue, and green "shadows" observed most often when the projected content features high contrast areas of moving bright or white objects on a mostly dark or black background. Brief visible separation of the colors can also be apparent when the viewer moves their eyes quickly across the projected image. Typically, the fast the user moves his eyes/head, the further apart the color appear.

The motion color artifact compensation module 406 reduces or eliminates the rainbow effect by compensating for color artifact based on predictable data. In other words, the motion color artifact compensation module 406 predicts where and how to render colors under user motion, and compensates motion-to-photon latency on a per color basis. In one example embodiment, the motion color artifact compensation module 406 includes a color cycle module 402 and a color sequence module 404.

The color cycle module 402 configures the light source 302 to generate only one single repetition of the base colors (RGB) per image frame. For example, a conventional light source 302 produces four color RGB-RGB-RGB-RGB (e.g., at about 60 Hz) per frame. The multiple color cycles result in stutter effects because the picture is seen four times at different positions. This stutter effect is especially exacerbated during head motion of the AR display device 110 while virtual content is displayed.

The color sequence module 404 identifies or determines a color sequence of the light source 302. As previously described, in a conventional DLP projector, as the user moves his head, a displayed virtual content will break up in its base colors, more precisely the color sequence will become visible. For example, a simple RGB sequence will bleed its three colors. The faster the user moves his head, the further apart the colors will appear. High frequency color sequences can be used to offset the color bleeding. However, the high frequency can lead to motion blur and unreadable text. The color sequence module 404 identifies the color sequence (R, G, and B) of the light source 302 and counters the effect of the color breakup based on the predicted color sequence for each frame.

The low persistence module 408 reduces persistence of each pixel by controlling the DMD 308 to direct light from the light source 302 away from the projection lens 310. In one example, the low persistence module 408 reduces the persistence of each pixel to, for example, less than 3 ms. In another example embodiment, the DLP controller 214 controls the DMD 308 to show black (direct the light away from the projection lens 310) 50% of the frame time, resulting in a shifting of individual color planes.

Figure 5:
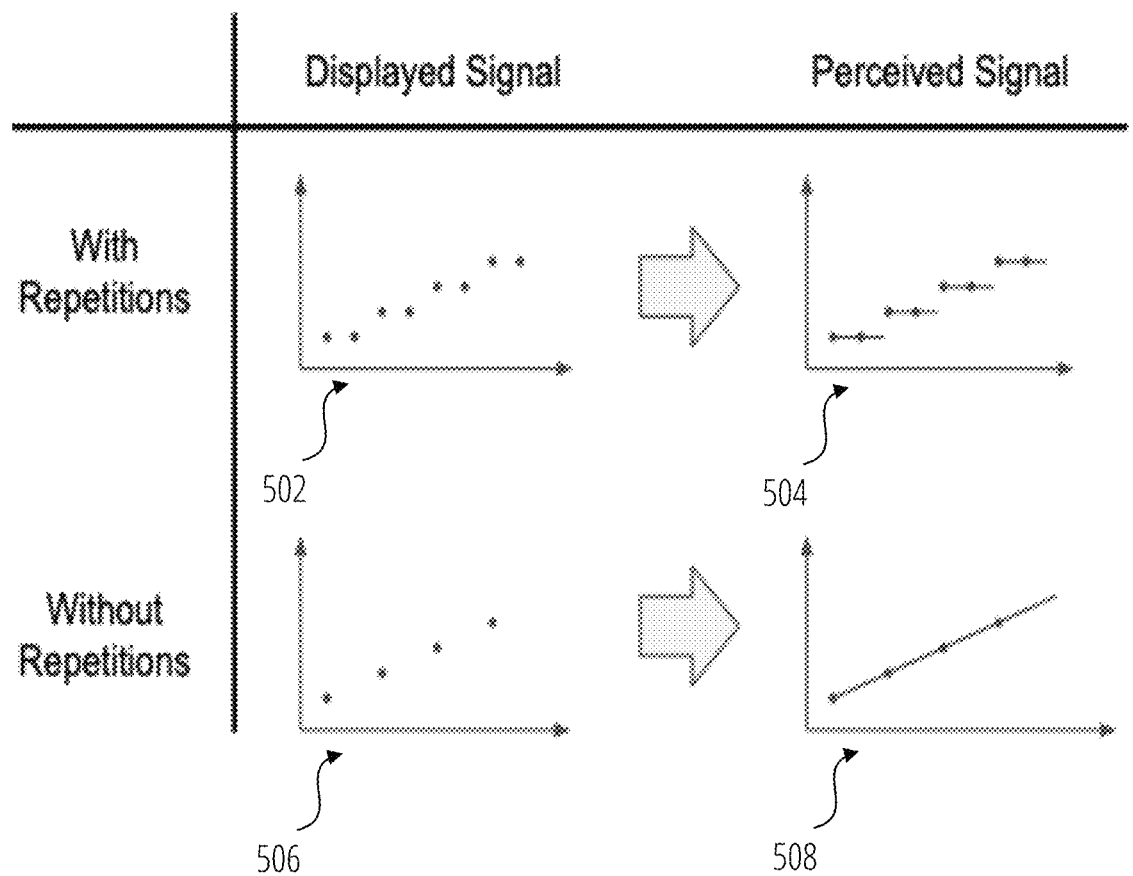
FIG. 5 is a chart illustrating image ghosting effects in accordance with one embodiment.

FIG. 5 is a chart illustrating image ghosting effects in accordance with one embodiment. Chart 502 illustrates an example of displayed signal based on repeated color cycles in a single frame. Chart 504 illustrates an example of perceived signal (by the user) based on the repeated color cycles in a single frame.

Chart 506 illustrates an example of displayed signal based on a single RGB cycle repetition in a single frame. Chart 508 illustrates an example of perceived signal (by the user) based on the single-color cycle in a single frame.

Figure 6:
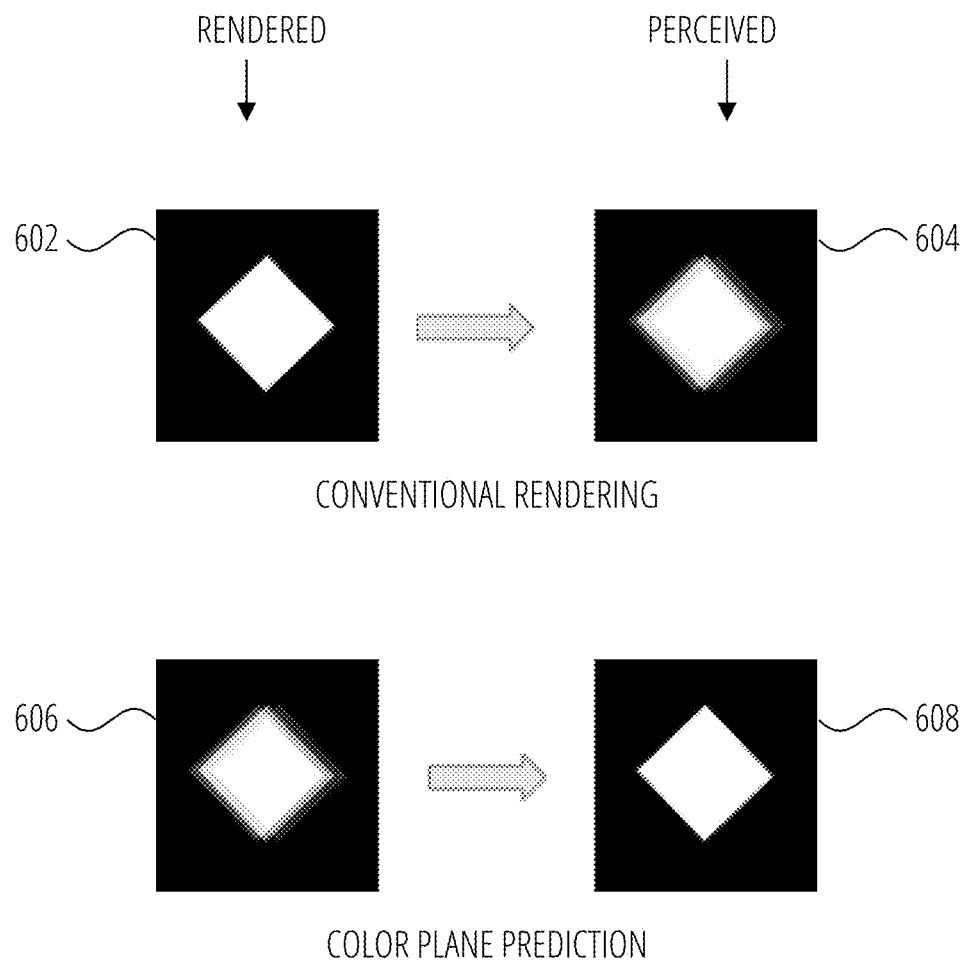
FIG. 6 is a chart illustrating predictive color sequences effects in accordance with one example embodiment.

FIG. 6 illustrates an example of a rainbow effect from conventional DLP projectors. DLP projectors utilizing a mechanical spinning color wheel may exhibit an anomaly known as the "rainbow effect". This is best described as brief flashes of perceived red, blue, and green "shadows" observed most often when the projected content features high contrast areas of moving bright or white objects on a mostly dark or black background. Common examples are the scrolling end credits of many movies, and also animations with moving objects surrounded by a thick black outline. Brief visible separation of the colors can also be apparent when the viewer moves their eyes quickly across the projected image. Some people perceive these rainbow artifacts frequently, while others may never see them at all.

This effect is caused by the way the eye follows a moving object on the projection. When an object on the screen moves, the eye follows the object with a constant motion, but the projector displays each alternating color of the frame at the same location for the duration of the whole frame. So, while the eye is moving, it sees a frame of a specific color (red, for example). Then, when the next color is displayed (green, for example), although it gets displayed at the same location overlapping the previous color, the eye has moved toward the object's next frame target. Thus, the eye sees that specific frame color slightly shifted. Then, the third color gets displayed (blue, for example), and the eye sees that frame's color slightly shifted again. This effect is not perceived only for the moving object, but the whole picture.

Image 602 illustrates a rendered image. Image 604 illustrates a rainbow effect image as perceived by a user. Image 606 illustrates a rainbow effect image predicted by a color plane (e.g., identified color sequence of a single-color cycle in a single frame). Image 608 illustrates a perceived image resulting from compensation operations based on the predicted rainbow effect.

Figure 7:
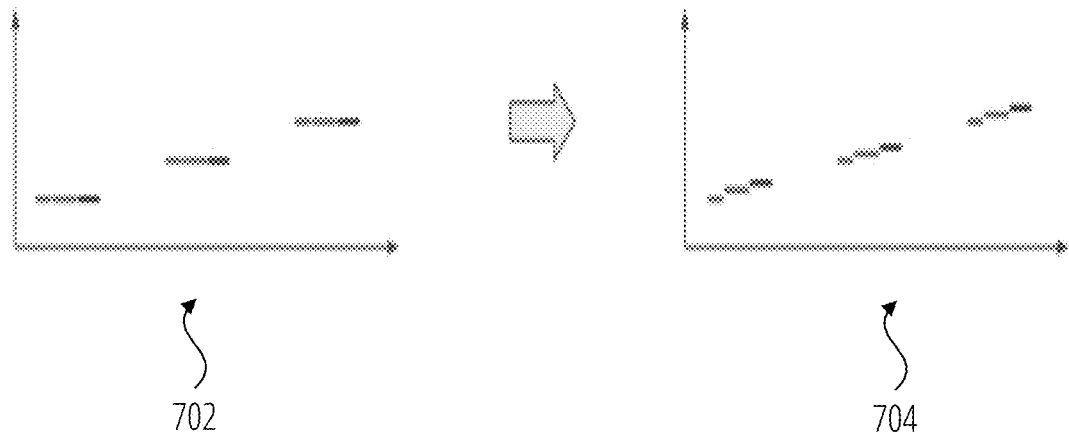
FIG. 7 is a chart illustrating a low color persistence effect in accordance with one example embodiment.

FIG. 7 is a chart illustrating a low color persistence effect in accordance with one example embodiment. Chart 702 illustrates color planes with all colors shifted together for each frame. Chart 704 illustrates color planes with colors shifted individually for each frame.

Figure 8:
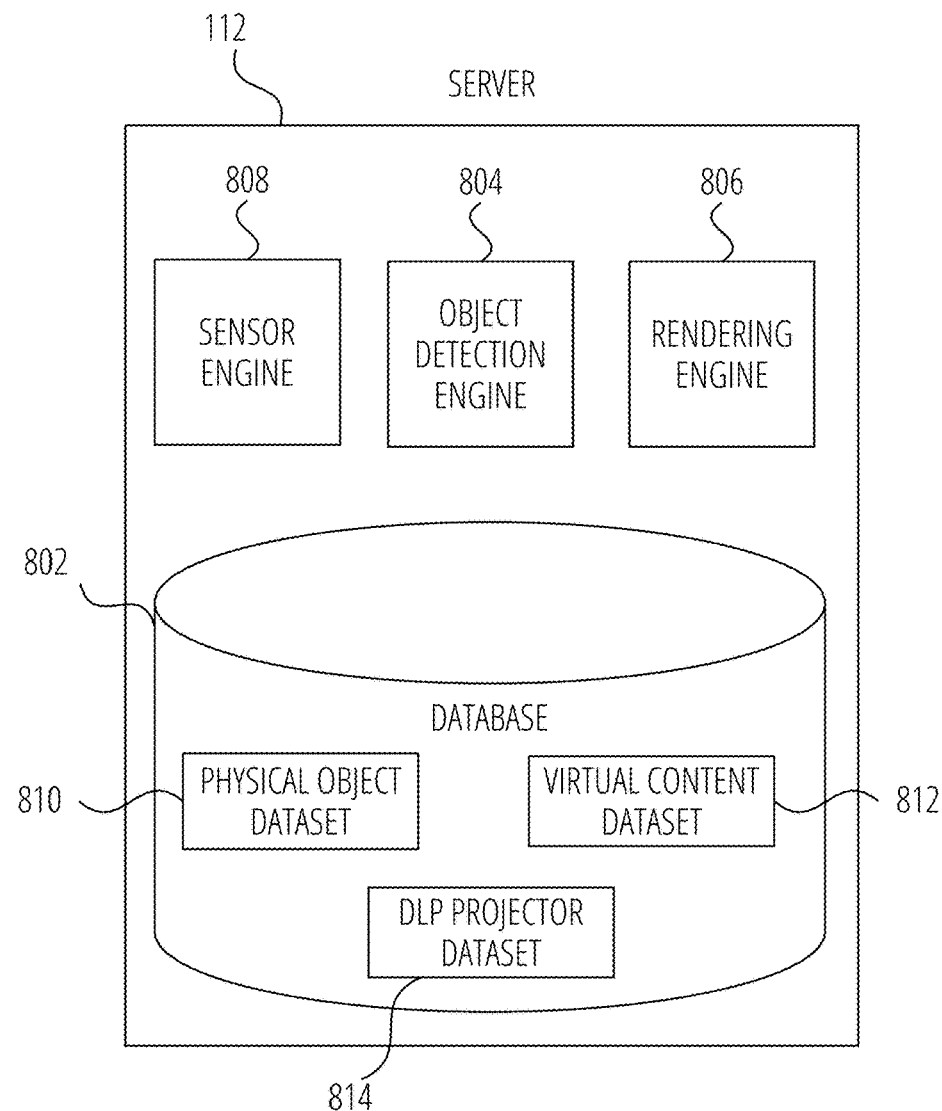
FIG. 8 illustrates a server in accordance with one example embodiment.

FIG. 8 is a block diagram illustrating modules (e.g., components) of the server 112. The server 112 includes a sensor engine 808, an object detection engine 804, a rendering engine 806, and a database 802.

The sensor engine 808 interfaces and communicates with sensors 202 to obtain sensor data related to a pose (e.g., location and orientation) of the AR display device 110 relative to a frame of reference (e.g., the room or real world environment 102) and to one or more objects (e.g., physical object 108).

The object detection engine 804 accesses the sensor data from sensor engine 808, to detect and identify the physical object 108 based on the sensor data. The rendering engine 806 generates virtual content that is displayed based on the pose of the AR display device 110 and the physical object 108.

The database 802 includes a physical object dataset 810, the virtual content dataset 812, and the DLP projector dataset 814. The physical object dataset 810 includes features of different physical objects. The virtual content dataset 812 includes virtual content associated with physical objects. The DLP projector dataset 814 stores configuration settings of the DLP projector 226.

Figure 9:
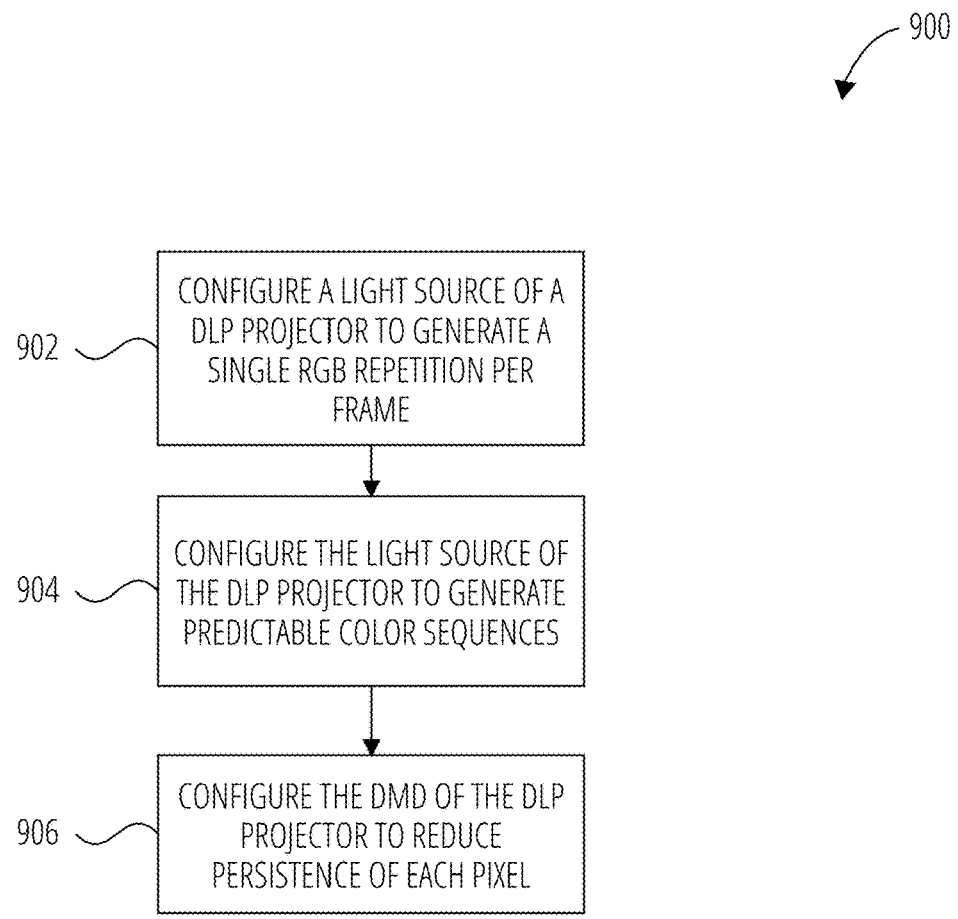
FIG. 9 is a flow diagram illustrating a method for configuring a DLP projector in accordance with one example embodiment.

FIG. 9 is a flow diagram illustrating a method for configuring a DLP projector in accordance with one example embodiment. Operations in the routine 900 may be performed by the DLP controller 214, using Components (e.g., modules, engines) described above with respect to FIG. 2. Accordingly, the routine 900 is described by way of example with reference to the DLP controller 214. However, it shall be appreciated that at least some of the operations of the routine 900 may be deployed on various other hardware configurations or be performed by similar Components residing elsewhere.

In block 902, the color cycle module 402 configures a color filter system (e.g., RGB LEDs) of a light source 302 of the DLP projector 226 to generate a single RGB repetition per frame. In block 904, the color sequence module 404 configures the light source 302 of the DLP projector 226 to generate predictable color sequences. In block 906, the low persistence module 408 configures the DMD 308 of the DLP projector 226 to reduce persistence of each pixel.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 10:
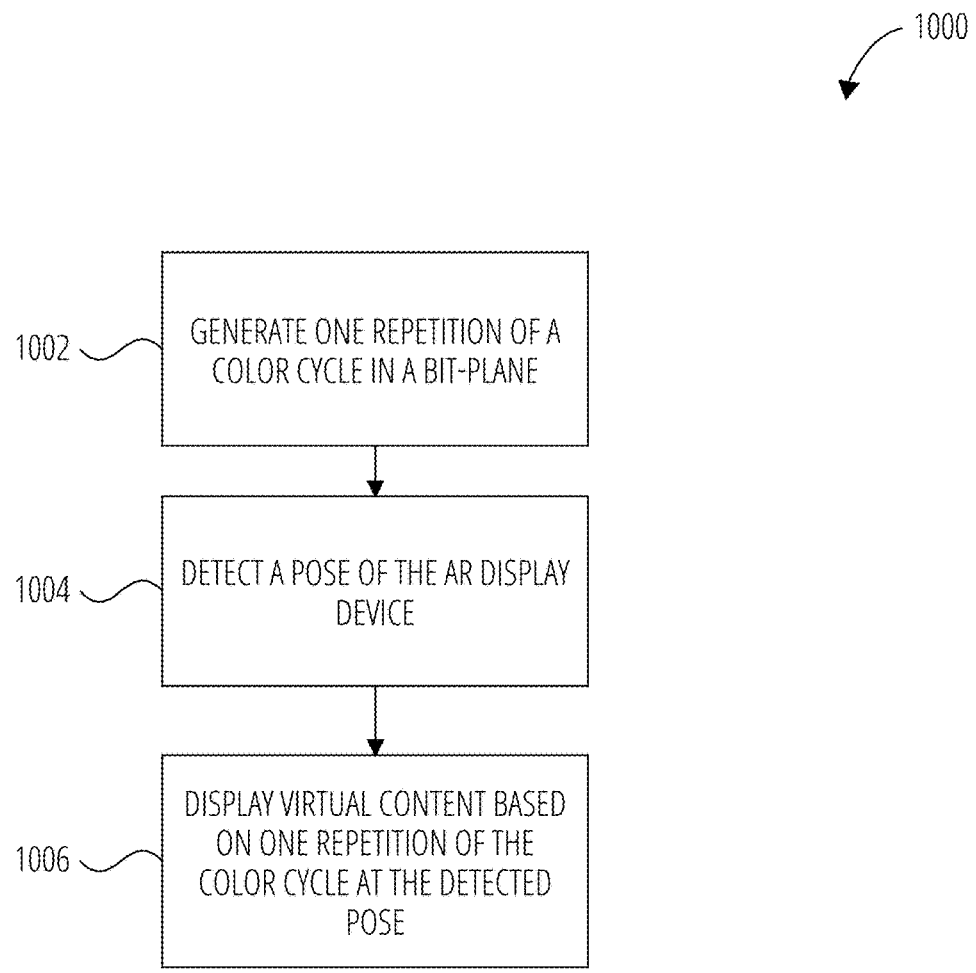
FIG. 10 is a flow diagram illustrating a method for operating a DLP projector in accordance with one example embodiment.

FIG. 10 is a flow diagram illustrating a method for operating a DLP projector in accordance with one example embodiment. Operations in the routine 1000 may be performed by the DLP controller 214, using Components (e.g., modules, engines) described above with respect to FIG. 2. Accordingly, the routine 1000 is described by way of example with reference to the DLP controller 214. However, it shall be appreciated that at least some of the operations of the routine 1000 may be deployed on various other hardware configurations or be performed by similar Components residing elsewhere. For example, some of the operations may be performed at the server 112.

In block 1002, the color cycle module 402 generate one repetition of a color cycle in a bit-plane. In block 1004, the tracking system 212 detects a pose of the AR display device. In block 1006, the DLP projector 226 projects virtual content on the screen 224 based on one repetition of the color cycle at the detected pose.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 11:
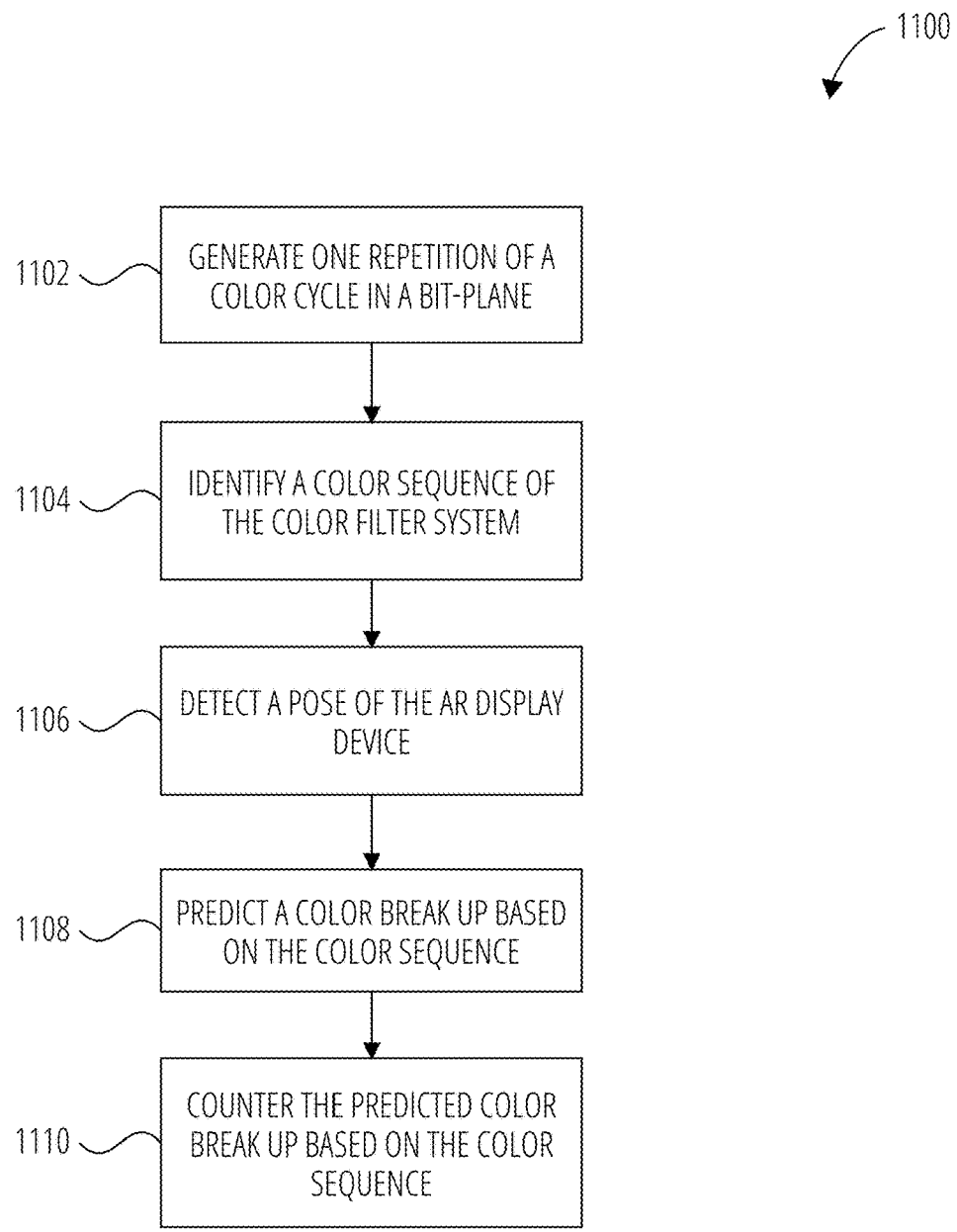
FIG. 11 is a flow diagram illustrating a method for operating a DLP projector in accordance with one example embodiment.

FIG. 11 is a flow diagram illustrating a method for operating a DLP projector in accordance with one example embodiment. Operations in the routine 1100 may be performed by the DLP controller 214, using Components (e.g., modules, engines) described above with respect to FIG. 2. Accordingly, the routine 1100 is described by way of example with reference to the DLP controller 214. However, it shall be appreciated that at least some of the operations of the routine 1100 may be deployed on various other hardware configurations or be performed by similar Components residing elsewhere. For example, some of the operations may be performed at the server 112.

In block 1102, the color cycle module 402 generates one repetition of a color cycle in a bit-plane. In block 1104, the color sequence module 404 identifies a color sequence of the light source 302. In block 1106, the tracking system 212 detects a pose of the AR display device. In block 1108, the motion color artifact compensation module 406 predicts a color break up based on the color sequence. In block 1110, the motion color artifact compensation module 406 counters the predicted color break up based on the color sequence.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 12:
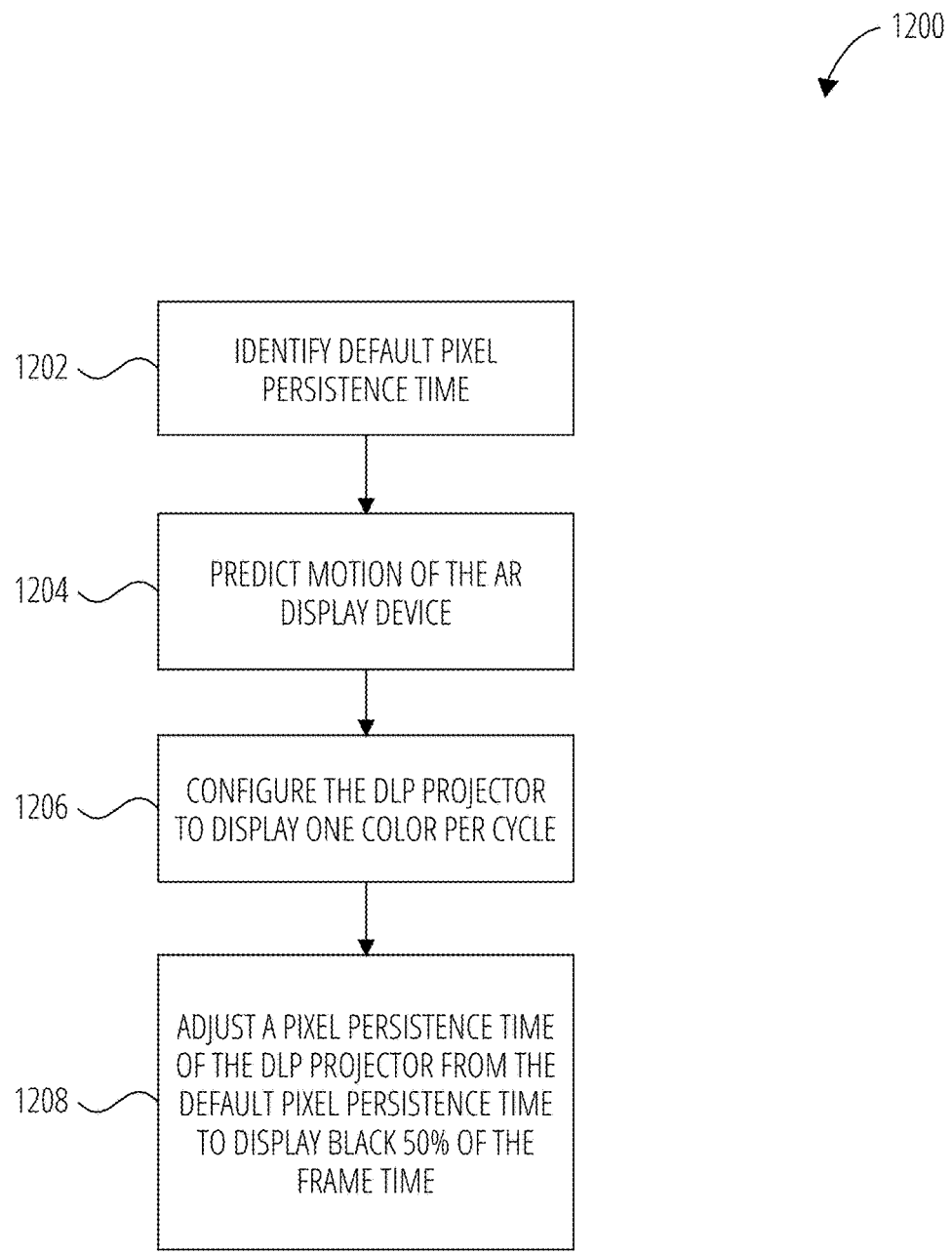
FIG. 12 is a flow diagram illustrating a method for adjusting a pixel persistence in accordance with one example embodiment.

FIG. 12 is a flow diagram illustrating a method for adjusting a pixel persistence in accordance with one example embodiment. Operations in the routine 1200 may be performed by the DLP controller 214, using Components (e.g., modules, engines) described above with respect to FIG. 2. Accordingly, the routine 1200 is described by way of example with reference to the DLP controller 214. However, it shall be appreciated that at least some of the operations of the routine 1200 may be deployed on various other hardware configurations or be performed by similar Components residing elsewhere. For example, some of the operations may be performed at the server 112.

In block 1202, the low persistence module 408 identifies default pixel persistence time. In block 1204, the tracking system 212 predicts motion of the AR display device 110. In block 1206, the color cycle module 402 configures the DLP projector 226 to display one color per cycle. In block 1208, the low persistence module 408 adjusts a pixel persistence time of the DLP projector 226 from the default pixel persistence time to display black 50% of the frame time.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 13:
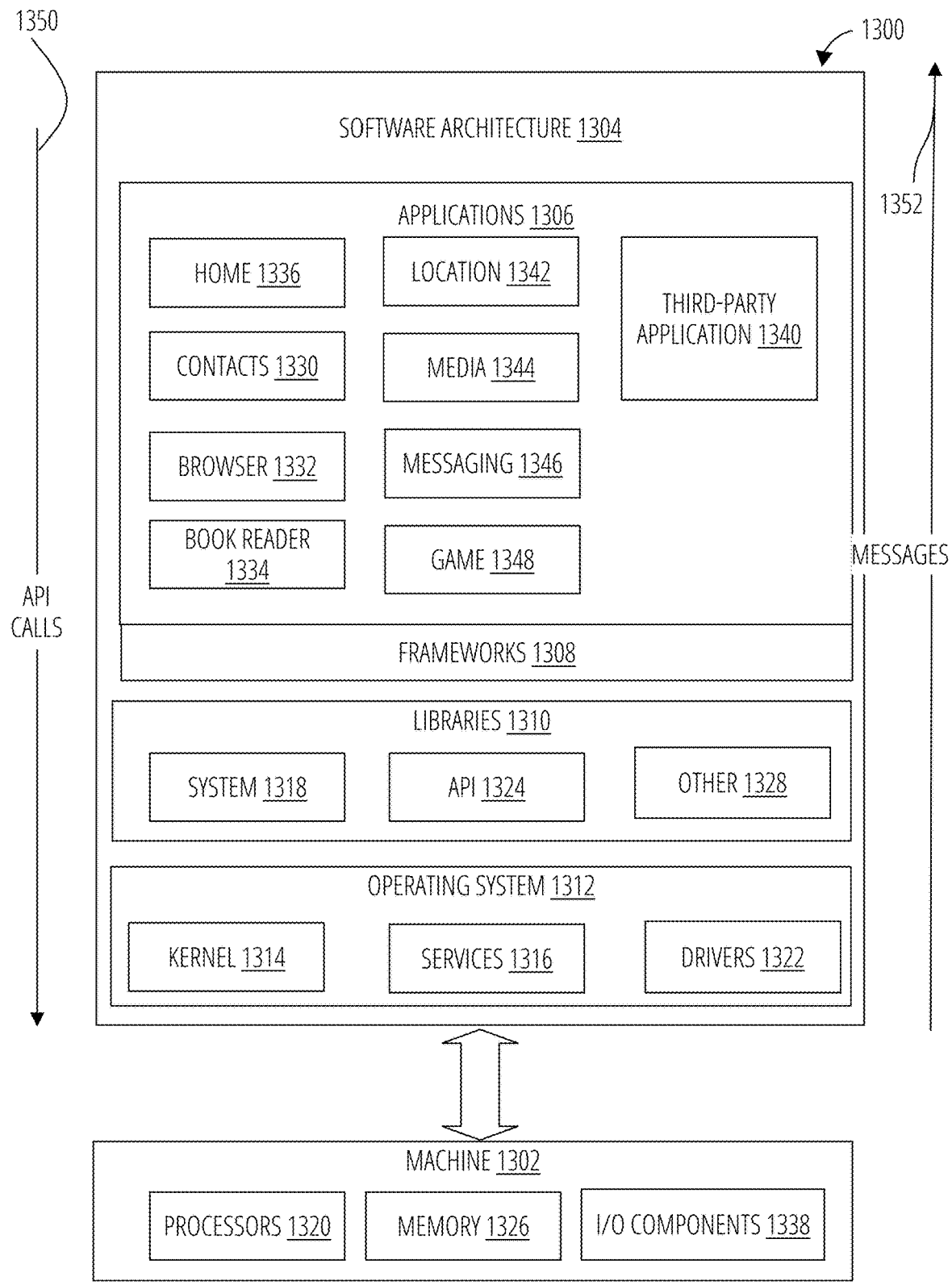
FIG. 13 is block diagram showing a software architecture within which the present disclosure may be implemented, according to an example embodiment.

FIG. 13 is a block diagram 1300 illustrating a software architecture 1304, which can be installed on any one or more of the devices described herein. The software architecture 1304 is supported by hardware such as a machine 1302 that includes Processors 1320, memory 1326, and I/O Components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, Processor management (e.g., scheduling), Component management, networking, and security settings, among other functionalities. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FIX drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4). Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Figure 14:
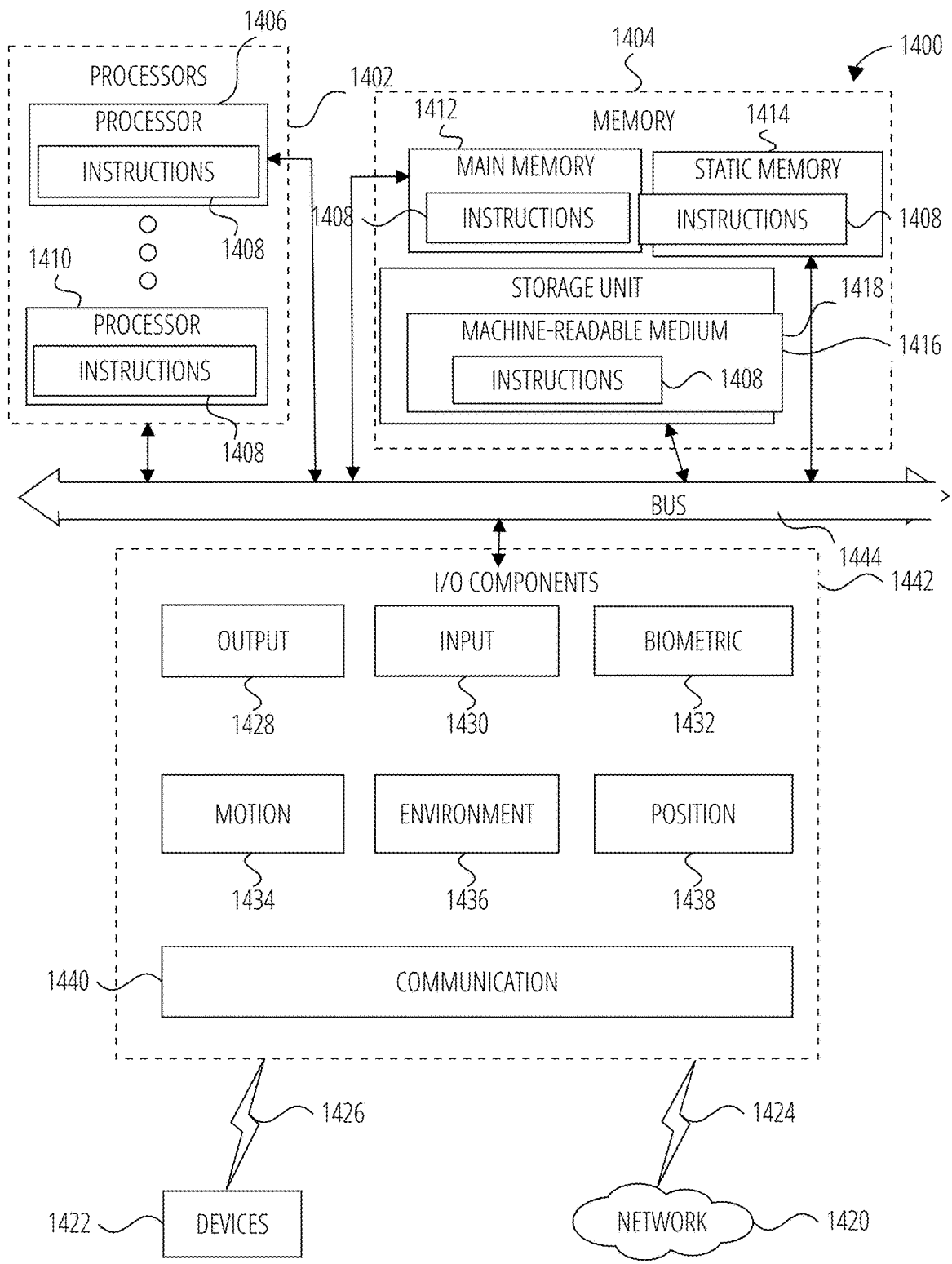
FIG. 14 is a diagrammatic representation of a machine in the form of a computer system within which a set of instructions may be executed for causing the machine to perform any one or more of the methodologies discussed herein, according to one example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include Processors 1402, memory 1404, and I/O Components 1442, which may be configured to communicate with each other via a bus 1444. In an example embodiment, the Processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1406 and a Processor 1410 that execute the instructions 1408. The term "Processor" is intended to include multi-core Processors that may comprise two or more independent Processors (sometimes referred to as "cores") that may execute instructions contemporaneously. Although FIG. 14 shows multiple Processors 1402, the machine 1400 may include a single Processor with a single core, a single Processor with multiple cores (e.g., a multi-core Processor), multiple Processors with a single core, multiple Processors with multiples cores, or any combination thereof.

The memory 1404 includes a main memory 1412, a static memory 1414, and a storage unit 1416, both accessible to the Processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the Processors 1402 (e.g., within the Processor's cache memory), or any suitable combination thereof, during execution thereof by the machine 1400.

The I/O Components 1442 may include a wide variety of Components to receive input, provide output, produce output, transmit information, exchange information, capture measurements, and so on. The specific I/O Components 1442 that are included in a particular machine will depend on the type of machine. For example, portable machines such as mobile phones may include a touch input device or other such input mechanisms, while a headless server machine will likely not include such a touch input device. It will be appreciated that the I/O Components 1442 may include many other Components that are not shown in FIG. 14. In various example embodiments, the I/O Components 1442 may include output Components 1428 and input Components 1430. The output Components 1428 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1430 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1442 may include biometric Components 1432, motion Components 1434, environmental Components 1436, or position Components 1438, among a wide array of other Components. For example, the biometric Components 1432 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1434 include acceleration sensor Components (e.g., accelerometer), gravitation sensor Components, rotation sensor Components (e.g., gyroscope), and so forth. The environmental Components 1436 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1438 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1442 further include communication Components 1440 operable to couple the machine 1400 to a network 1420 or devices 1422 via a coupling 1424 and a coupling 1426, respectively. For example, the communication Components 1440 may include a network interface Component or another suitable device to interface with the network 1420. In further examples, the communication Components 1440 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1422 may be another machine or any of a wide variety of peripheral devices (e.g., a peripheral device coupled via a USB).

Moreover, the communication Components 1440 may detect identifiers or include Components operable to detect identifiers. For example, the communication Components 1440 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the Processors 1402) and/or storage unit 1416 may store one or more sets of instructions and data structures (e.g., software) embodying or used by any one or more of the methodologies or functions described herein. These instructions (e.g., the instructions 1408), when executed by Processors 1402, cause various operations to implement the disclosed embodiments.

The instructions 1408 may be transmitted or received over the network 1420, using a transmission medium, via a network interface device (e.g., a network interface Component included in the communication Components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for configuring a digital light projector (DLP) of an augmented reality (AR) display device comprising: configuring a light source component of the DLP projector to generate a single red-green-blue color sequence repetition per image frame, identifying a color sequence of the light source component of the DLP projector; tracking a motion of the AR display device; and adjusting an operation of the DLP projector based on the single red-green-blue color sequence repetition, the color sequence of the light source component of the DLP projector, and the motion of the AR display device.

Example 2 includes example 1, wherein adjusting the operation of the DLP projector further comprises: reducing a motion artifact produced by the DLP projector based on the identified color sequence and the single red-green-blue color sequence repetition per image frame.

Example 3 includes example 1, wherein adjusting the operation of the DLP projector further comprises: identifying a motion artifact produced by the DLP projector based on the identified color sequence, the single red-green-blue color sequence repetition per image frame, and the motion of the AR display device; generating a counter artifact that offsets the motion artifact based on the identified motion artifact; and causing the DLP projector to display the counter artifact.

Example 4 includes example 3, further comprising: shifting each color plane individually based on the adjusted pixel persistence value.

Example 5 includes example 3, further comprising: shifting each bit plane of each color plane individually based on the adjusted pixel persistence value.

Example 6 includes example 1, further comprising: determining an adjusted pixel persistence value based on the identified color sequence and the single red-green-blue color sequence repetition per image frame; replacing the default pixel persistence value with the adjusted pixel persistence value; and operating the DLP projector with the adjusted pixel persistence value.

Example 7 includes example 6, further comprising: shifting each color plane individually based on the adjusted pixel persistence value.

Example 8 includes example 6, further comprising: shifting each bit plane of each color plane individually based on the adjusted pixel persistence value.

Example 9 includes example 6, wherein operating the DLP projector further comprises: controlling a DMD of the DLP projector to light a pixel for the adjusted pixel persistence value.

Example 10 includes example 1, further comprising: accessing virtual content; and displaying, on a screen of the AR display device, the virtual content with the adjusted operation of the DLP projector, the virtual content being displayed one time per image frame.

Example 11 is a computing apparatus comprising: a processor; and a memory storing instructions that, when executed by the processor, configure the apparatus to: configure a light source component of the DLP projector to generate a single red-green-blue color sequence repetition per image frame; identify a color sequence of the light source component of the DLP projector; track a motion of the AR display device; and adjust an operation of the DLP projector based on the single red-green-blue color sequence repetition, the color sequence of the light source component of the DLP projector, and the motion of the AR display device.

Example 12 includes example 11, wherein adjusting the operation of the DLP projector further comprises: reduce a motion artifact produced by the DLP projector based on the identified color sequence and the single red-green-blue color sequence repetition per image frame.

Example 13 includes example 11, wherein adjusting the operation of the DLP projector further comprises: identify a motion artifact produced by the DLP projector based on the identified color sequence, the single red-green-blue color sequence repetition per image frame, and the motion of the AR display device; generate a counter artifact that offsets the motion artifact based on the identified motion artifact; and cause the DLP projector to display the counter artifact.

Example 14 includes example 13, wherein the instructions further configure the apparatus to: shift each color plane individually based on the adjusted pixel persistence value.

Example 15 includes example 13, wherein the instructions further configure the apparatus to: shift each bit plane of each color plane individually based on the adjusted pixel persistence value.

Example 16 includes example 11, wherein the instructions further configure the apparatus to: determine an adjusted pixel persistence value based on the identified color sequence and the single red-green-blue color sequence repetition per image frame; replace the default pixel persistence value with the adjusted pixel persistence value; and operate the DLP projector with the adjusted pixel persistence value.

Example 17 includes example 16, wherein the instructions further configure the apparatus to: shift each color plane individually based on the adjusted pixel persistence value.

Example 18 includes example 16, wherein the instructions further configure the apparatus to: shift each bit plane of each color plane individually based on the adjusted pixel persistence value.

Example 19 includes example 16, wherein operating the DLP projector further comprises: control a DMD of the DLP projector to light a pixel for the adjusted pixel persistence value.

Example 20 is a non-transitory computer-readable storage medium, the computer-readable storage medium including instructions that when executed by a computer, cause the computer to: configure a light source component of the DLP projector to generate a single red-green-blue color sequence repetition per image frame; identify a color sequence of the light source component of the DLP projector; track a motion of the AR display device; and adjust an operation of the DLP projector based on the single red-green-blue color sequence repetition, the color sequence of the light source component of the DLP projector, and the motion of the AR display device.

What is claimed is:

1. A method for configuring a digital light projector (DLP) of an augmented reality (AR) display device comprising:
    configuring a light source component of the DLP projector to generate a single red-green-blue color sequence repetition per image frame;
    identifying a color sequence of the light source component of the DLP projector;
    tracking a motion of the AR display device; and
    adjusting an operation of the DLP projector based on the single red-green-blue color sequence repetition, the color sequence of the light source component of the DLP projector, and the motion of the AR display device,
    wherein adjusting the operation of the DLP projector further comprises:
        identifying a motion artifact produced by the DLP projector based on the identified color sequence, the single red-green-blue color sequence repetition per image frame, and the motion of the AR display device;
        generating a counter artifact that offsets the motion artifact based on the identified motion artifact;
        causing the DLP projector to display the counter artifact; and
        shifting each bit plane of each color plane individually based on an adjusted pixel persistence value.

2. The method of claim 1, wherein adjusting the operation of the DLP projector further comprises:
    reducing a motion artifact produced by the DLP projector based on the identified color sequence and the single red-green-blue color sequence repetition per image frame.

3. The method of claim 1, further comprising:
    shifting each color plane individually based on aft the adjusted pixel persistence value.

4. The method of claim 1, further comprising:
determining the adjusted pixel persistence value based on the identified color sequence and the single red-green-blue color sequence repetition per image frame;
replacing a default pixel persistence value with the adjusted pixel persistence value; and
operating the DLP projector with the adjusted pixel persistence value.

5. The method of claim 4, further comprising:
shifting each color plane individually based on the adjusted pixel persistence value.

6. The method of claim 4, wherein operating the DLP projector further comprises:
controlling a digital micromirror device (DMD) of the DLP projector to light a pixel for the adjusted pixel persistence value.

7. The method of claim 1, further comprising:
accessing virtual content; and
displaying, on a screen of the AR display device, the virtual content with the adjusted operation of the DLP projector, the virtual content being displayed one time per image frame.

8. A computing apparatus comprising:
a processor; and
a memory storing instructions that, when executed by the processor, configure the apparatus to:
configure a light source component of a DLP projector to generate a single red-green-blue color sequence repetition per image frame;
identify a color sequence of the light source component of the DLP projector;
track a motion of an AR display device; and
adjust an operation of the DLP projector based on the single red-green-blue color sequence repetition, the color sequence of the light source component of the DLP projector, and the motion of the AR display device,
wherein adjusting the operation of the DLP projector further comprises:
identifying a motion artifact produced by the DLP projector based on the identified color sequence, the single red-green-blue color sequence repetition per image frame, and the motion of the AR display device;
generating a counter artifact that offsets the motion artifact based on the identified motion artifact;
causing the DLP projector to display the counter artifact; and
shifting each bit plane of each color plane individually based on an adjusted pixel persistence value.

9. The computing apparatus of claim 8, wherein adjusting the operation of the DLP projector further comprises:
reduce a motion artifact produced by the DLP projector based on the identified color sequence and the single red-green-blue color sequence repetition per image frame.

10. The computing apparatus of claim 8, wherein the instructions further configure the apparatus to:
shift each color plane individually based on the adjusted pixel persistence value.

11. The computing apparatus of claim 8, wherein the instructions further configure the apparatus to:
determine the adjusted pixel persistence value based on the identified color sequence and the single red-green-blue color sequence repetition per image frame;
replace a default pixel persistence value with the adjusted pixel persistence value; and
operate the DLP projector with the adjusted pixel persistence value.

12. The computing apparatus of claim 11, wherein the instructions further configure the apparatus to:
shift each color plane individually based on the adjusted pixel persistence value.

13. The computing apparatus of claim 11, wherein operating the DLP projector further comprises:
control a digital micromirror device (DMD) of the DLP projector to light a pixel for the adjusted pixel persistence value.

14. A non-transitory computer-readable storage medium, the computer-readable storage medium including instructions that when executed by a computer, cause the computer to:
configure a light source component of a DLP projector to generate a single red-green-blue color sequence repetition per image frame;
identify a color sequence of the light source component of the DLP projector;
track a motion of an AR display device; and
adjust an operation of the DLP projector based on the single red-green-blue color sequence repetition, the color sequence of the light source component of the DLP projector, and the motion of the AR display device,
wherein adjusting the operation of the DLP projector further comprises:
identifying a motion artifact produced by the DLP projector based on the identified color sequence, the single red-green-blue color sequence repetition per image frame, and the motion of the AR display device;
generating a counter artifact that offsets the motion artifact based on the identified motion artifact;
causing the DLP projector to display the counter artifact; and
shifting each bit plane of each color plane individually based on an adjusted pixel persistence value.

* * * * *